United States Patent
Yang et al.

(10) Patent No.: US 12,524,108 B2
(45) Date of Patent: Jan. 13, 2026

(54) MULTI TOUCH PADS DESIGN FOR MOVING OBJECT DETECTION

(71) Applicant: STMicroelectronics International N.V., Geneva (CH)

(72) Inventors: Chia Feng Yang, Taoyuan (TW); Wenbin Yang, Shenzhen (CN); Dequan Wu, Shenzhen (CN); Xinyu Song, Shenzhen (CN); Zhanbing Li, Shenzhen (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/396,234

(22) Filed: Dec. 26, 2023

(65) Prior Publication Data

US 2025/0208728 A1  Jun. 26, 2025

(51) Int. Cl.
*G06F 3/041* (2006.01)
*G06F 3/0354* (2013.01)
*G06F 3/038* (2013.01)
*G06F 3/044* (2006.01)

(52) U.S. Cl.
CPC ...... *G06F 3/04166* (2019.05); *G06F 3/03547* (2013.01); *G06F 3/0383* (2013.01); *G06F 3/044* (2013.01)

(58) Field of Classification Search
CPC ............ G06F 3/04166; G06F 3/03547; G06F 3/0383; G06F 3/044; G06F 1/1698; G06F 3/016; G06F 1/1643; G06F 3/0346; G06F 3/017; G06F 3/0488

See application file for complete search history.

(56) References Cited

U.S. PATENT DOCUMENTS

| | | | |
|---|---|---|---|
| 11,092,998 B1 * | 8/2021 | Castañeda | G06V 40/1306 |
| 11,449,172 B1 | 9/2022 | Chang | |
| 2004/0081339 A1 | 4/2004 | Benkley, III | |
| 2008/0007534 A1 * | 1/2008 | Peng | G06F 3/0446 345/173 |
| 2015/0185525 A1 * | 7/2015 | Xu | G06F 3/041 349/12 |
| 2015/0268796 A1 * | 9/2015 | Tsuyuzaki | G06F 3/0445 345/174 |
| 2015/0346893 A1 * | 12/2015 | Schevin | G06F 3/043 345/174 |
| 2019/0286265 A1 | 9/2019 | Post et al. | |
| 2022/0283643 A1 | 9/2022 | Chaudhri et al. | |
| 2022/0326762 A1 * | 10/2022 | Andersen | G06F 3/0444 |
| 2022/0342530 A1 | 10/2022 | Liao et al. | |

* cited by examiner

*Primary Examiner* — Sujit Shah
(74) *Attorney, Agent, or Firm* — Alston & Bird LLP

(57) ABSTRACT

Systems, apparatuses, methods, and computer program products for multi touch pads for object detection are provided. The multi touch pads are each electrically connected via an associated electrode to one or two electrode input ports of an electrostatic sensor. When a touch pad is touched a voltage is generated at the associated electrode input of the electrostatic input. As two touch pads detect touch over time from a motion, the electrostatic sensor detects the motion from the difference in voltage signals received. The electrostatic sensor generates a sensor signal output that may be transmitted to one or more additional circuitries to indicate that motion has been detected, which may trigger one or more operations depending on an application.

20 Claims, 8 Drawing Sheets

MULTI TOUCH PADS DESIGN FOR MOVING OBJECT DETECTION

TECHNOLOGICAL FIELD

Example embodiments of the present disclosure relate generally to multi touch pads design for moving object detection, and particularly to using a single electrostatic sensor with multiple touch pads.

BACKGROUND

Devices, such as mobile and/or wearable devices require instantaneous touch sensing to implement functions, such as volume control, task switching, etc. Conventional touch sensing may require a sensing electrode on a surface of the device or beneath a shielding layer. These devices, however, have limited surface area. Additionally, such devices are limited in size and space. Additionally circuitry and/or drivers for touch sensing are very limited in space.

Conventional touch sensing may be performed by one of multiple technologies. For example, capacitive touch pad technology and electrostatic sensor technology are distinct examples. Capacitive touch technology requires a dedicated host integrated circuit (IC) and custom PCB pattern designs. These require greater space, device requirements, and cost. Conventional electrostatic sensors have 2 electrode inputs (e.g., electrostatic sensor input pins) to support two electrodes-one electrode for each electrode input. Thus each input knows the electrode that is providing a signal indicating a touch at the single touch pad associated with the electrode input. Thus having 2 electrode inputs per electrostatic sensor limits an electrostatic sensor to distinguish only 2 input signals.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to disclosure to multi touch pads design for moving object detection, and particularly to using a single electrostatic sensor with multiple touch pads.

In accordance with some embodiments of the present disclosure, an example system for motion detection] is provided. The system for motion detection may comprise: an electrostatic sensor comprised of a first electrode input and a second electrode input, the first electrode input is electrically connected via a first group of electrodes to a first group of touch pads of a plurality of touch pads, and the second electrode input is electrically connected via a second group of electrodes to a second group of touch pads of the plurality of touch pads; each touch pad of the first group of touch pads is further electrically connected to one voltage source of a distinct voltage or ground and configured to provide a distinct voltage to the first electrode input in response to touch; each touch pad of the second group of touch pads is further electrically connected to one voltage source of a distinct voltage or ground and configured to provide a distinct voltage to the second electrode input in response to touch; and the electrostatic sensor is configured to generate an output of a sensor signal based on a determination of a motion based at least on a voltage difference between a first voltage at the first electrode input and a second voltage at a second electrode input.

In some embodiments, the plurality of touch pads is part of a touch pad array.

In some embodiments, the touch pad array is configured with the plurality of touch pads arranged linearly in a first direction.

In some embodiments, the plurality of touch pads is configured to generate a rising waveform in response to motion in a first direction.

In some embodiments, the plurality of touch pads is configured to generate a falling waveform in response to motion in a first direction.

In some embodiments, the electrostatic sensor comprises an analog-to-digital converter configured to convert a voltage at the first electrode input and a voltage at the second electrode input into a decimal value, and the electrostatic sensor is further configured to generate the output of a sensor signal based on a determination of a motion based at least on a voltage difference by using a plurality of thresholds based on different decimal values associated with the voltage difference.

In some embodiments, the electrostatic sensor is further configured to generate the output of a sensor signal including an indication of motion is a first direction.

In some embodiments, the electrostatic sensor is further configured to generate the output of a sensor signal including an indication of motion is a second direction.

In some embodiments, the electrostatic sensor is incorporated into a MEMS sensor.

In some embodiments, the system is incorporated into one of smart glasses, a smartphone, a smart light, IoT device, or touch panel.

In accordance with some embodiments of the present disclosure, an example method for motion detection is provided. The method for motion detection may comprise: providing an electrostatic sensor comprised of a first electrode input and a second electrode input, the first electrode input is electrically connected via a first group of electrodes to a first group of touch pads of a plurality of touch pads, and the second electrode input is electrically connected via a second group of electrodes to a second group of touch pads of the plurality of touch pads; reading, by the electrostatic sensor, a first voltage at the first electrode inputs and a second voltage at a second electrode input; determining a voltage difference between the first voltage and the second voltage; and generating an output of a sensor signal based on the voltage difference, and the sensor signal indicates motion.

In some embodiments, the plurality of touch pads is part of a touch pad array.

In some embodiments, the touch pad array is configured with the plurality of touch pads arranged linearly in a first direction.

In some embodiments, the plurality of touch pads is configured to generate a rising waveform in response to motion in a first direction.

In some embodiments, the plurality of touch pads is configured to generate a falling waveform in response to motion in a first direction.

In some embodiments, the electrostatic sensor is further comprised of an analog-to-digital converter; and reading a first voltage and a second voltage comprises converting the first voltage and the second voltage from analog signals to digital signals of decimal values.

In some embodiments, generating the output of the sensor signal comprises generating the sensor signal comprising an indication of motion in a first direction.

In some embodiments, generating the output of the sensor signal comprises generating the sensor signal comprising an indication of motion in a second direction.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
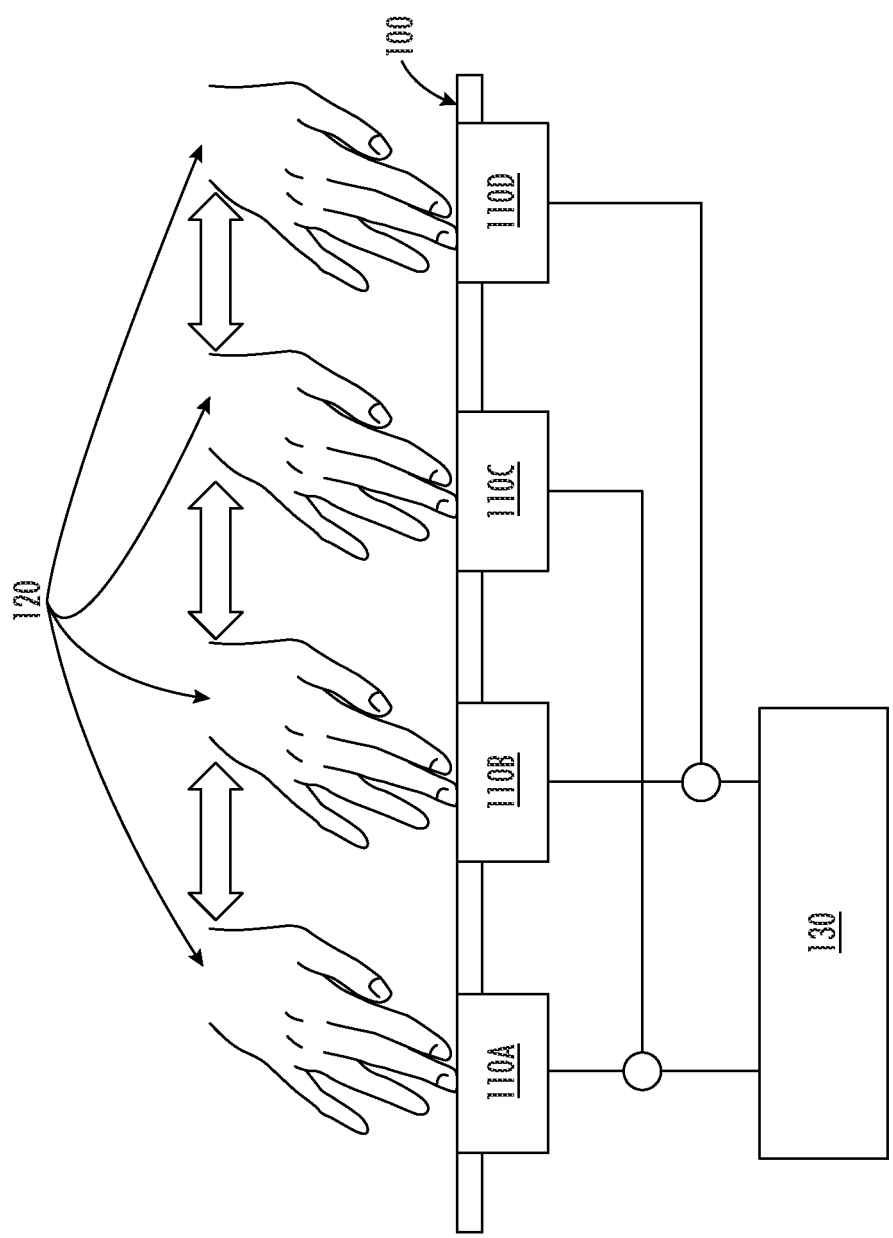
Figure 2:
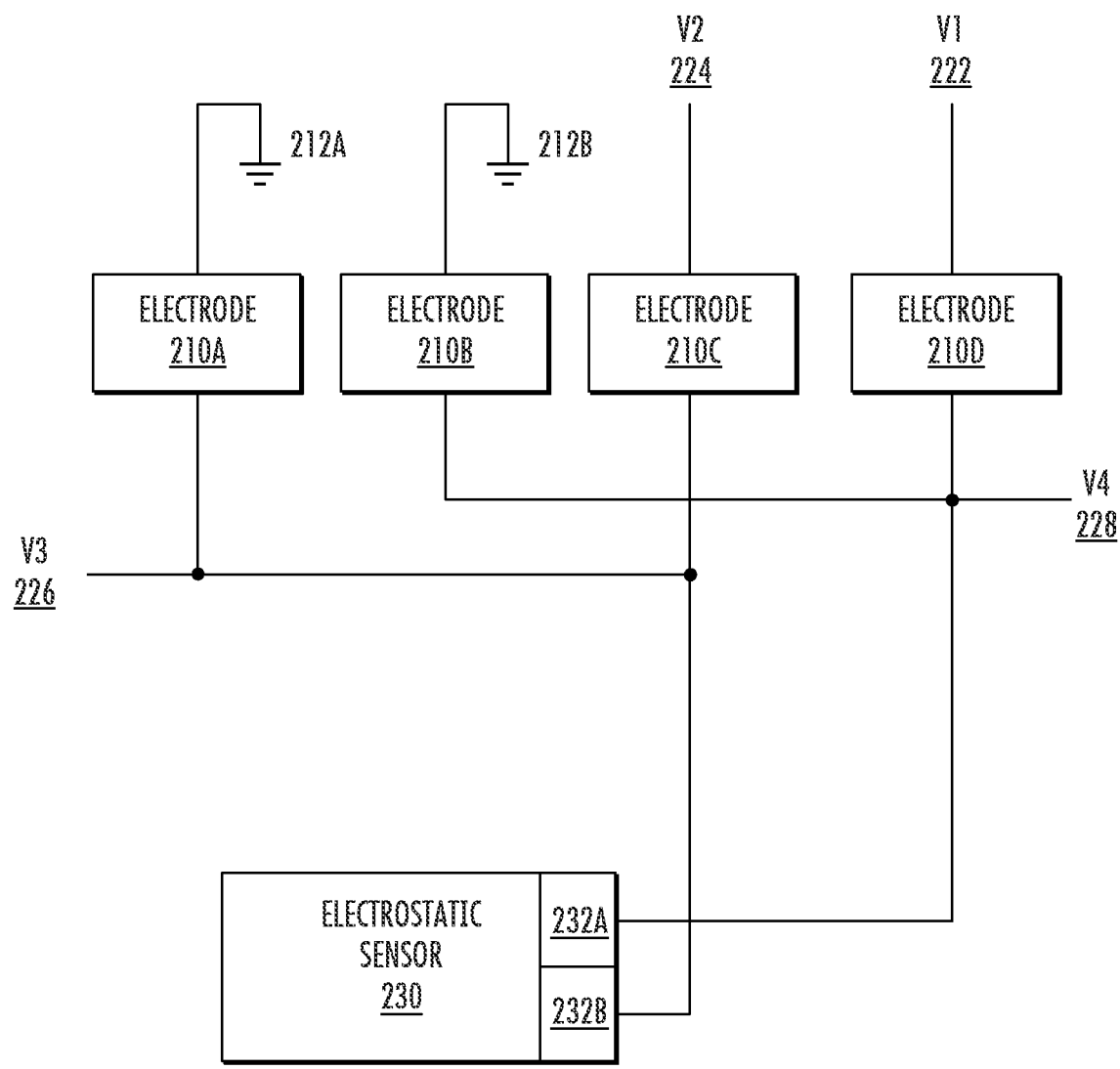
Figure 3A:
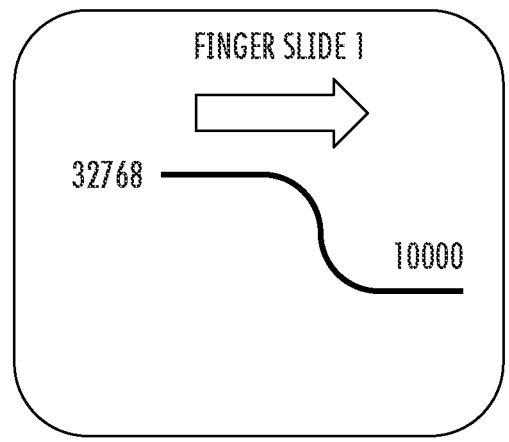
Figure 3B:
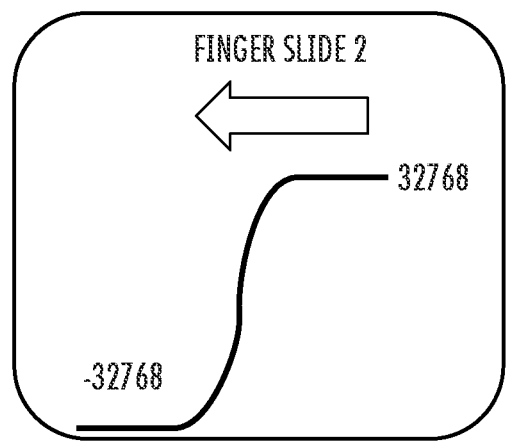
Figure 4:
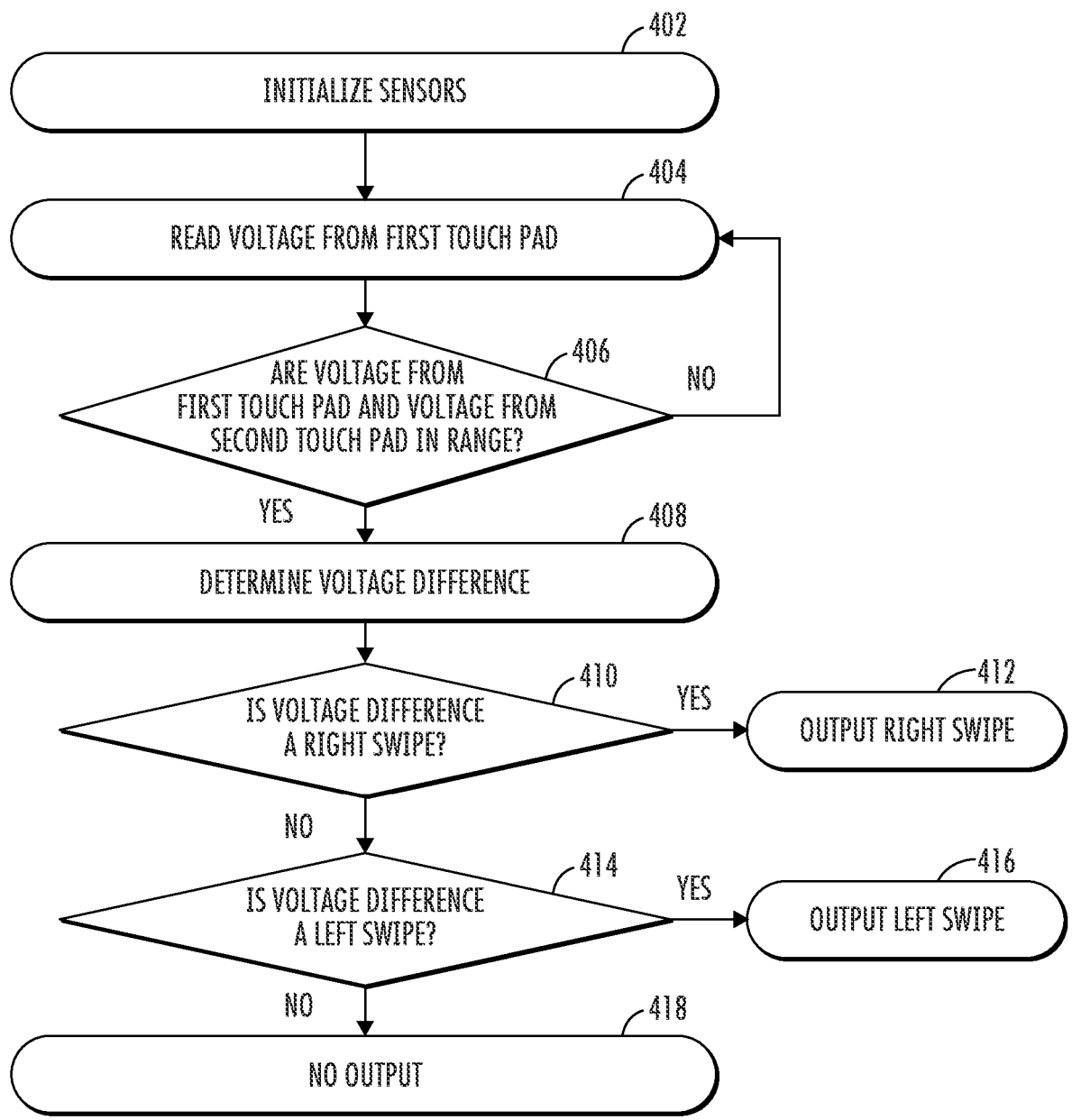
Figure 6:
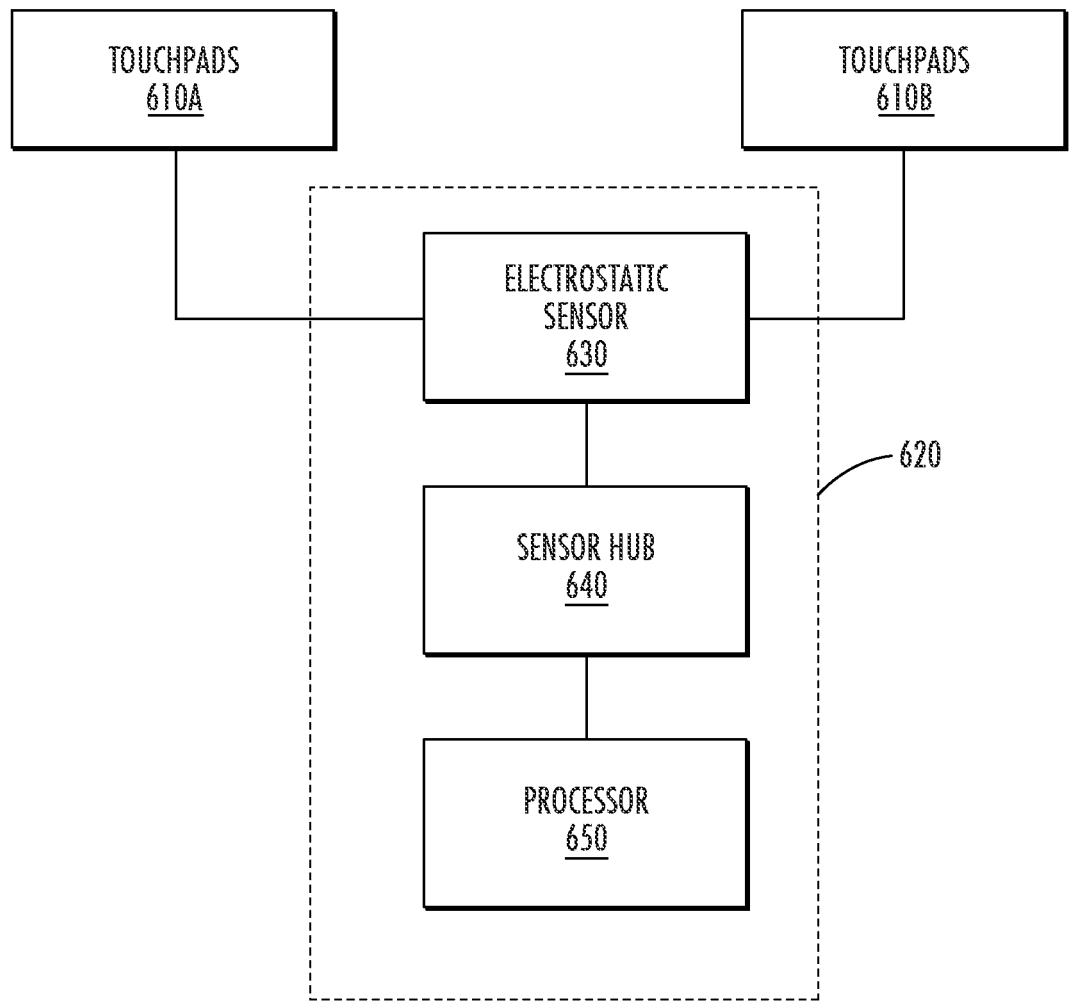
Figure 7:
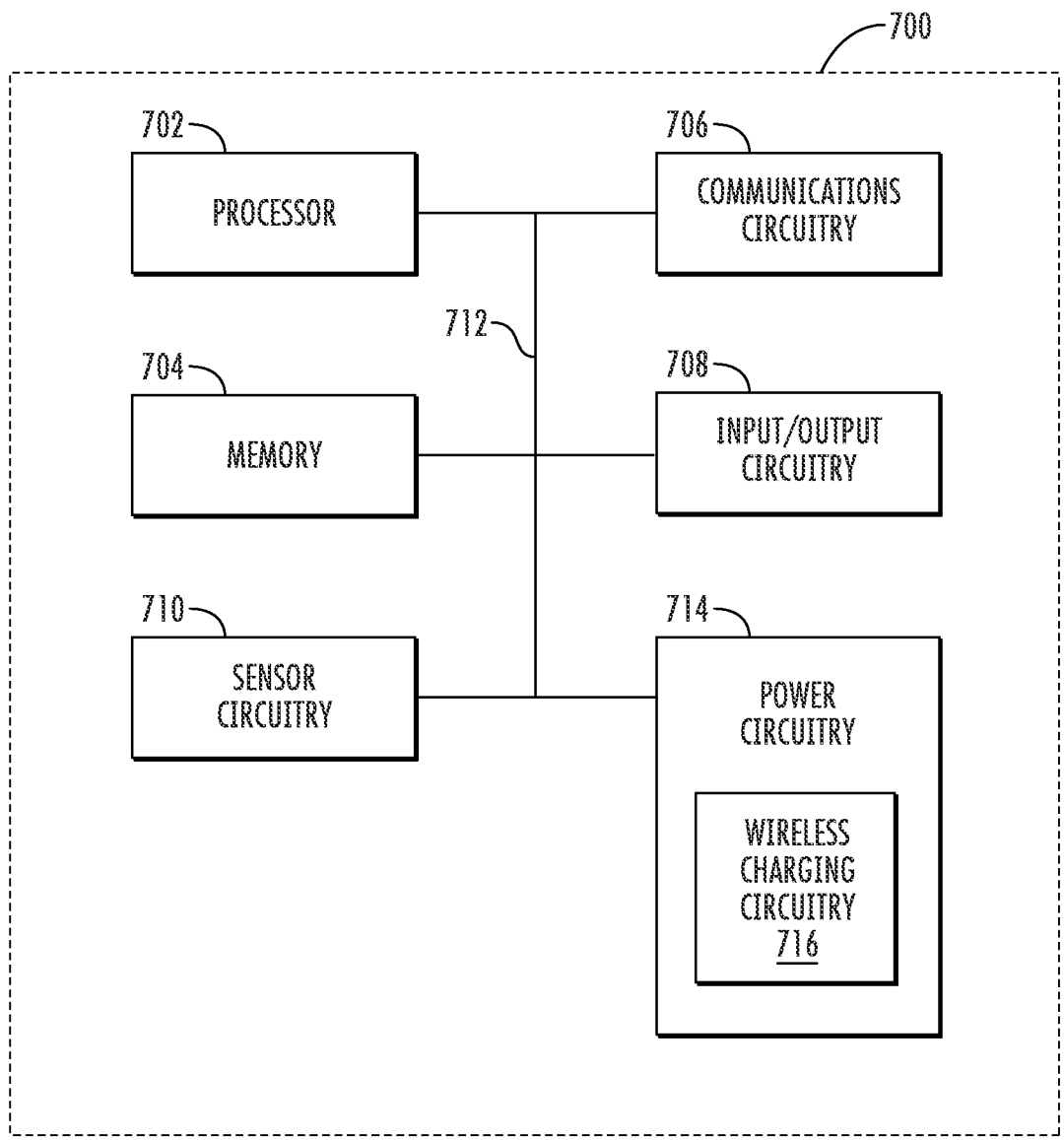

Having thus described certain example embodiments of the present disclosure in general terms, reference will now be made to the accompanying drawings, which are not necessarily drawn to scale, and wherein:

FIG. 1 illustrates an exemplary block diagram for touchpads in accordance with one or more embodiments of the present disclosure;

FIG. 2 illustrates an exemplary circuitry for touchpads in accordance with one or more embodiments of the present disclosure;

FIGS. 3A and 3B illustrate exemplary graphs of waveforms associated with motion in accordance with one or more embodiments of the present disclosure;

FIG. 4 illustrates an exemplary flowchart of operations for generating outputs in accordance with one or more embodiments of the present disclosure;

FIGS. 5A-5D illustrate exemplary flowcharts of additional operations for generating outputs in accordance with one or more embodiments of the present disclosure;

FIG. 6 illustrates an exemplary block hardware diagram with a sensor hub for multiple touch pad arrays in accordance with one or more embodiments of the present disclosure; and FIG. 7 illustrates an example block hardware diagram of a device in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

Overview

Various embodiments of the present disclosure are directed to improved multi touch pads for moving object detection. Devices that use touch sensing for motion include mobile device and wearables, such as smart glasses, smartphones, smart lights, IoT device, touch panels, and the like. Embodiments of the present disclosure include motion detection for such devices via multi touch pads for moving object detection. For example, the multi touch pads may be able to determine when a user swipes a surface of a device with movement of one or more fingers across a plurality of electrodes.

Various embodiments may include electrostatic sensor electrically connected to a plurality of touch pads in a touch pad array. Each touch pad may include or be associated with an electrode. The electrostatic sensor is an electrical charge sensing channel able to measure a direct or inductive transfer of electric charge, or a charge polarization, due to touch and/or motion. The touch or motion results in a charge transfer or charge polarization on the electrodes that are connected to the input pins of the differential input, which induces an electrical potential on the input pins of the differential input. Electrostatic sensors enable applications including but not limited to contact and no-contact human motion detection and human motion gait analysis, human presence detection, user interface (UI) interactions, and water detection.

While conventional electrostatic sensors have been offered, such as the Qvar electrostatic sensor offered by STMicroelectronics, such conventional electrostatic sensors are limited. For example, a multi-input configuration per electrode input is not supported by conventional electrostatic sensors. To achieve such multi-input configuration(s) one or more additionally electrostatic sensors are needed, such as described in the present disclosure. This increases the number of electrodes to be electrically connected to a 2-input electrostatic sensor.

A touch pad may also be referred to as an electrode pad. Multiple touch pads may be physically connected to form a touch pad array of multiple touch pads. A touch pad array may be placed or on integrated into a surface of a device.

In various embodiments, the order of electrodes for each touch pad of a multi touch pad array may be aligned with an increasing and/or decreasing voltage setting such that motion across the electrodes may generate a rising and/or falling waveform of voltages. This may be based on the circuitry and voltage biases associated with each of the electrodes and/or touch pads.

Based on the voltage signals received from the electrodes, various embodiments may generate an output that distinguishes a direction of movement of an object over two or more of the touch pads. As described herein, this may be done without increasing the number of electrostatic sensors despite the increase in the number of multitouch pads and associated electrodes.

When an object touching the surface moves from a first touch pad to a second touch pad the electrostatic sensor detects the movement over a period of time or time frame (e.g., 300 ms). The electrostatic sensor not only knows the detection of movement but also the direction of movement, which is based on a specified location of the touch pads. Thus it is known if an object is moving, for example, from left-to-right or from right-to-left, which may be indicative of a gesture of a right swipe or a left swipe, respectively.

In various embodiments, an electrostatic sensor package may include both the electrostatic sensor and at least one touch pad array containing multiple touch pads. Thus one package may be used to cover larger areas of a device than conventional electrostatic sensor packages.

Additionally or alternatively, various embodiments of the present disclosure may incorporate the electrostatic sensor into a MEMS sensor and, thus, omit the need for a separate driver for the electrostatic sensor.

In various embodiments, a device may include a sensor hub, which may be communicate with a device processor or application processor, which may be electrically connected to and control other device circuitries. When the sensor hub senses touch or motion from the touch pads then the sensor hub may generate a sensor signal to the application processor indicating, among other things, the touch or motion detected. The sensor signal may be an interrupt signal. The application processor may perform one or more operations based on the sensor signal and associated with the touch and/or motion sensed. For example, smart glasses may use a swipe for determining one or more images to display in the lens(es) of the smart glasses, going to a next or previous image, and the like. Additionally or alternatively, various applications of device may use to the sensor signal to start or stop one or more operations associated with a detected gesture, such as a swipe in a first direction or in a second direction.

Exemplary Systems, Apparatuses, and Methods

Embodiments of the present disclosure herein include systems and apparatuses for multi touch pads design for moving object detection. Various embodiments are directed to providing a plurality of multi touch pads to one electrostatic sensor with multiple multi touch pads connected to each input pin.

FIG. 1 illustrates an exemplary block diagram for touch pads in accordance with one or more embodiments of the present disclosure. FIG. 1 includes a plurality of touch pads 110 (e.g., 110A, 110B, 110C, 110D) integrated and/or on a surface 100. The touch pads 110 that sense when an object 120 (e.g., finger(s) of a hand) is moved across the touch pads 110. The electrostatic sensor 130 receives signals from a plurality of the touch pads 110 via two sensor inputs. Multiple of the electrodes in the touch pads 110 are connected in parallel so that each sensor input of the electrostatic sensor 130 is electrically connected to multiple of the plurality of touch pads 110. Thus a single electrostatic sensor supports multiple electrodes associated with the multiple touch pads 110.

In various embodiments, a touch pad 110 have a surface area of 3 mm×1 mm. A touch pad array of four touch pads 110 may have a surface area of 12 mm×1 mm when all four touch pads 110 are in a linear array.

FIG. 2 illustrates an exemplary circuitry for touch pads in accordance with one or more embodiments of the present disclosure. An electrostatic sensor 230 may have two electrode inputs 232, which may be pins. The two electrode inputs may be a first electrode input 232A and a second electrode input 232B. The electrostatic sensor 230 may be electrically connected to a plurality of electrodes 210 via the two electrode inputs 232. Each electrode 210 may be associated with one of the touch pads 110. For example, an electrode 210 may be embedded in the touch pad 110.

In various embodiments, the electrostatic sensor 230 may be electrically connected to four touch pads 110 via the four electrodes 210 respectively associated with each of the touch pads 110. A first electrode 210A and a third electrode 210C may be electrically connected to the second electrode input 232B. A second electrode 210B and a fourth electrode 210D may be electrically connected to the first electrode input 232A.

Each electrode 210 may be electrically connected to a voltage source and/or a ground in addition to the electrode input 232, which may associate the respective electrode 210 with a voltage bias.

The first electrode 210A and third electrode 210C may be electrically connected in parallel to the electrostatic sensor 230 at the second electrode input 232B.

The first electrode 210A may be electrically connected to a ground 212A at a first terminal and at a second terminal be electrically connected to the second electrode input 232B of the electrostatic sensor 230. Additionally, the second terminal of electrode 210A may be electrically connected to a bias voltage V3 226 as well as a second terminal of third electrode 210C.

The third electrode 210C may be electrically connected to a second voltage V2 224 at a first terminal and at a second terminal be electrically connected to the second electrode input 232B of the electrostatic sensor 230. Additionally, the second terminal of electrode 210C may be electrically connected to a bias voltage V3 226 as well as a second terminal of first electrode 210C.

The second electrode 210B and fourth electrode 210D may be electrically connected in parallel to the electrostatic sensor 230 at the first electrode input 232B.

The second electrode 210B may be electrically connected to a ground 212B at a first terminal and at a second terminal be electrically connected to the first electrode input 232A of the electrostatic sensor 230. Additionally, the second terminal of electrode 210B may be electrically connected to a bias voltage V4 228 as well as a second terminal of fourth electrode 210D.

The fourth electrode 210D may be electrically connected to a first voltage V1 222 at a first terminal and at a second terminal be electrically connected to the first electrode input 232A of the electrostatic sensor 230. Additionally, the second terminal of electrode 210D may be electrically connected to a bias voltage V4 228 as well as a second terminal of second electrode 210B.

It will be appreciated that the ground 212A and 212B may be electrically connected and/or indirectly electrically connected to the same ground.

It will also be appreciated that the bias voltage V3 226 and bias voltage 228 may be the same voltage but will be electrically separate by additional circuitry so as to isolate the respective connections to the electrode input 232 of the electrostatic sensor. For example, each bias voltage V3 may be separately derived from the same voltage rail or voltage source by voltage dividing the voltage from the voltage source with a plurality of resistors and/or other electrical components.

It will be appreciated that various embodiments may include more than 4 electrodes 210 and/or touch pads 110 that are similarly electrically connected to a single electrostatic sensor 230 via two electrode input 232.

In various embodiments, V1 may be 3.3 V, V2 may be 1.5V, V3 may be 1.65V, and V4 may be 1.65V. When an object touches and/or moves across an electrode a voltage signal may be generated based on how an electrode 210 is electrically connected. For example, electrode 210A may generate a differential signal of 1.65V between the electrode inputs 232A and 232B as V3 226 is grounded, electrode 210B may generate a differential signal of −1.65V between the electrode inputs 232A and 232B as V4 228 is grounded, electrode 210C may generate a 0.15V differential signal between the electrode inputs 232A and 232B as V3 226 is biased at 1.5V, electrode 210A may generate a differential signal of 1.65V between the electrode inputs 232A and 232B as V4 228 is biased at 3.3V.

In an application, the electrostatic sensor may detect a 1.65V signal at each electrode input pin indicating that no touch or movement is detected. A change to another voltage on the electrode input pins allows for detection of a gesture.

In various embodiments, the first electrode input 232A may be associated with a positive or plus pin or voltage and the second electrode input 232B may be associated with a negative or min pin or voltage. The plus input pin may be referred to as a non-inverting pin as the voltage received is not inverted. The negative input pin may be referred to as an inverting pin as the voltage received is inverted. Thus a full voltage swing in such embodiments may be from +3.3V to −3.3V.

A detected voltage difference may be the difference between the voltage sensed between each of the electrode inputs 232, which when no touch or motion is detected may be a difference of V3−V4. For example, if electrode 210A is touched then the voltage difference may be −1.65V, which is 0 V−1.65 V. If electrode 210D is touched then it may be 1.65V, which is 3.3V−1.65V.

As an object moves from one touch pad to another touch pad, the electrostatic sensor may determine a voltage differential between the two electrode inputs 232. The determination of the voltage difference allows for generating a sensor signal associated with a determination of a direction of a gesture as described herein.

Additional touch pads 110 and their associated additional electrodes may be added in various embodiments. To add additional electrodes, the first terminal of additional electrodes will be electrically connected to a voltage not previously connected to by another electrode connected to the same electrode inputs 232 as other electrodes illustrated. For example, an additional electrode 210E may be added to provide an input to the first electrode input 232A by electrically connected a first terminal of electrode 210E to a distinct voltage, such as 0.825V (which is ¼ of 3.3V).

The electrostatic sensor 230 output is obtained by converting the voltage inputs at the electrode input pins to integer values (e.g., a 16-bit integer) by an analog-to-digital converter. The ADC may be incorporated into the electrostatic sensor 230 and/or MEMS sensor. The integer values are then compared as the electrostatic sensor reads the pins at regular time periods. In an embodiment that uses a 16-bit ADC, a positive 3.3V may be represented by the integer 32768 and a −3.3V may be represented by a negative −32768. Various voltages between 3.3V and −3.3V will be represented with values between 32768 and −32768. It will be appreciated that different sizes of ADCs may be used, which may result in different integer values.

FIGS. 3A and 3B illustrate exemplary graphs of waveforms associated with motion in accordance with one or more embodiments of the present disclosure. The movement of an object (e.g., a finger) may be used to detect the movement direction based on the voltage difference, which may be detected and/or illustrated as a waveform.

In various embodiments, and as illustrated in FIG. 3A, the layout of the touch pads 110 is such that a waveform with a falling voltage is generated, which may indicate a motion (e.g., a swipe) in a first direction (e.g., left-to-right). The falling waveform may be associated with a first voltage reading a decimal value of a first voltage of 32768 and a second voltage reading a decimal value of 10000. As 10000 is less than 32768 this waveform is falling.

In various embodiments, and as illustrated in FIG. 3B, the layout of the touch pads 110 is such that a waveform with a rising voltage is generated, which may indicate motion (e.g., a swipe) in a second direction (e.g., right-to-left). The rising waveform may be associated with a first voltage reading a decimal value of a first voltage of −32768 and a second voltage reading a decimal value of 32768. As −32768 is less than 32768 this waveform is rising.

In a touch pad array, the touch pads 110 may be aligned to be arranged with increasing/decreasing voltages as read by the electrostatic sensor 230. This may allow for each input pin to have an electrode pad with a positive voltage as well as a zero voltage. It may be configured to distinguish the motion direction of each 2 pads. Thus a sensing area covered by a touch pad array may be extended by adding more touch pads 110 to a single electrostatic sensor 230 without requiring additional electrostatic sensors 230, which saves on physical space, reduces complexity, and reduces cost.

FIG. 4 illustrates an exemplary flowchart of operations for generating outputs in accordance with one or more embodiments of the present disclosure. The operations may be performed by the electrostatic sensor 230 and/or a device comprising an electrostatic sensor 230.

At operation 402, initialize sensors. In various embodiments the sensors may just be an electrostatic sensor 130 or it may be one or more additional sensors associated with a device, such as a MEMS sensor that the electrostatic sensor 130 may be incorporated into.

At operation 404, read voltage from a first touch pad. An electrostatic sensor 230 may read the electrode inputs 232 once or more a time period. For example, the electrostatic sensor 230 may read the electrode inputs 232 every 300 ms to determine if a voltage associated with a touch of a first touch pad of a plurality of touch pads 110 has changed. This operation is described further with respect to FIG. 5A.

At operation 406, determine if a voltage from a first touch pad and a voltage from a second touch pad are in range. In various embodiments, after a voltage from a first touch pad is detected then the electrostatic sensor may read data from the electrode inputs 232 at a second time to determine motion is occurring between the two touch pads 110. To determine if a touch is sensed at the first touch pad 110 and the second touchpad 110 over one or more time periods, an electrostatic sensor 130 may detect if the decimal value of the voltages is within one or more ranges associated with the electrodes 210 of the respective touch pads 110. This may be a check that the voltage read at the electrode inputs 232 are associated with a voltage(s) corresponding to a touch of a touch pad and not an erroneous signal. Thus if both the voltage from the first touch pad and the voltage from the second touch pad are within the thresholds of expected ranges then the electrostatic sensors know a valid touch and/or motion has occurred and proceed to operation 408. If either of the voltages are not within the expected ranges, then proceed to read another voltage at operation 404. This operation 406 is described further with respect to FIG. 5B.

At operation 408, a voltage difference is determined. The voltage difference may be a subtraction of the decimal value of the first voltage from the second voltage (e.g., V2−V1). This voltage difference may also be in a format of a 16-bit value that may range from plus or minus 65,536.

At operation 410, determine if the voltage is a right swipe. In various embodiments, this may be a determine that a gesture is in a first direction from a first touch pad 110 to a second touch pad 110, which may be a right swipe. This determination may be based on a plurality of thresholds that the voltage difference is compared against. If the voltage difference is within a range associated with these thresholds, then proceed to operation 412. Otherwise proceed to operation 414. This operation is described further with respect to FIG. 5C.

At operation 412, a right swipe is output. The output may be sensor signal that is generated by the electrostatic sensor 230 and transmitted to, for example, a processor. The sensor signal may be a digital or an analog signal associated with the gesture of a swipe in a first direction, which may be a right swipe.

At operation 414, determine if the voltage is a left swipe. In various embodiments, this may be a determine that a gesture is in a second direction from a second touch pad 110 to a first touch pad 110, which may be a left swipe. This determination may be based on a plurality of thresholds that the voltage difference is compared against. If the voltage difference is within a range associated with these thresholds, then proceed to operation 416. Otherwise proceed to operation 418. This operation is described further with respect to FIG. 5D. This operation is described further with respect to FIG. 5D.

At operation 416, a left swipe is output. The output may be sensor signal that is generated by the electrostatic sensor 230 and transmitted to, for example, a processor. The sensor signal may be a digital or an analog signal associated with the gesture of a swipe in a second direction, which may be a left swipe.

At operation 418, no output is generated. If the thresholds of the ranges associated with operations 410 and 414 are not met, then the voltage threshold is not determined to be associated with a gesture. Thus no output is generated as the voltage difference may be due to a false reading.

FIG. 5A-5D illustrate exemplary flowcharts of additional operations for generating outputs in accordance with one or more embodiments of the present disclosure. These figures use values associated with an embodiment using a +3.3V high voltage that may be converted to a decimal value via at least a 16-bit ADC to generate a decimal of 65,536, which is from 32768 for +3.3V to −32768 for −3.3V. By taking the differences in voltage levels the direction of motion of a swipe or finger slide may be determined.

Figure 5A:
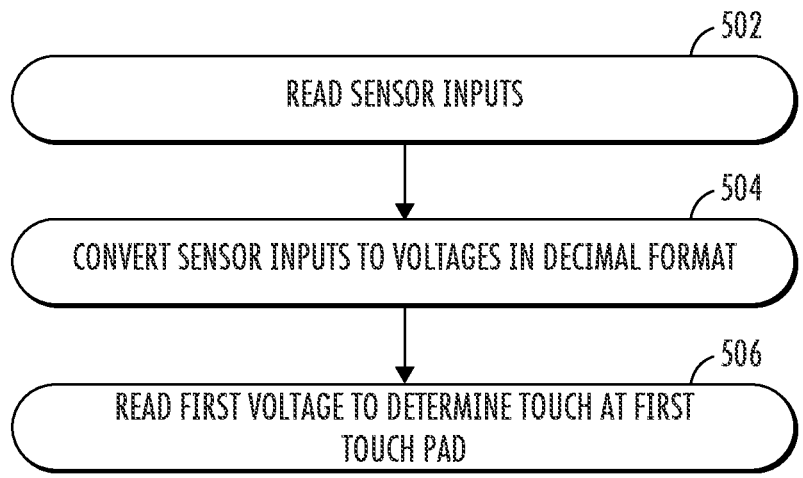

FIG. 5A illustrates additional operations that may be associated with operation 404 in various embodiments in accordance with the present disclosure. Start reading charge data collected by the sensor, including convert ADC output to a decimal value of charges. The electrostatic sensor 230 may convert the voltage to a 16-bit integer decimal.

At operation 502, read sensor inputs. The sensor inputs may be read from the first electrode input 232A and the second electrode input 232B. The sensor inputs may be an analog signal. The sensor inputs may be read periodically. In various embodiments, the periodicity may be every 300 ms.

At operation 504, convert the sensor inputs to voltages in decimal format. The electrostatic sensor 230 may include one or more ADCs, such as a 16-bit ADC. The ADC may convert the analog signal of a sensor input to a 16-bit signal based on the analog voltage received. Based on the configurations of the voltage sources electrically connected to each electrode 210 (e.g., V1 222, V2 224, or the like), there are a set of known decimal values or 16-bit values known for the voltages of a device.

At operation 506, read a first voltage to determine touch at first touch pad. The decimal values of the voltages are read to determine if a touch is present at an associated touch pad 110. Each touch pad 110 is configured to generate a specific voltage via the associated electrode 210 at the associated electrode input 232. By reading the voltages at each electrode input 232 the electrode sensor 230 determine is a voltage associated with the first electrode input 232A or a voltage associated with the second electrode input 232B has changed and thus a voltage associated with a present is detected. This may be referred to as a first voltage as it may refer to a first touch of a touch pad 110.

Figure 5B:
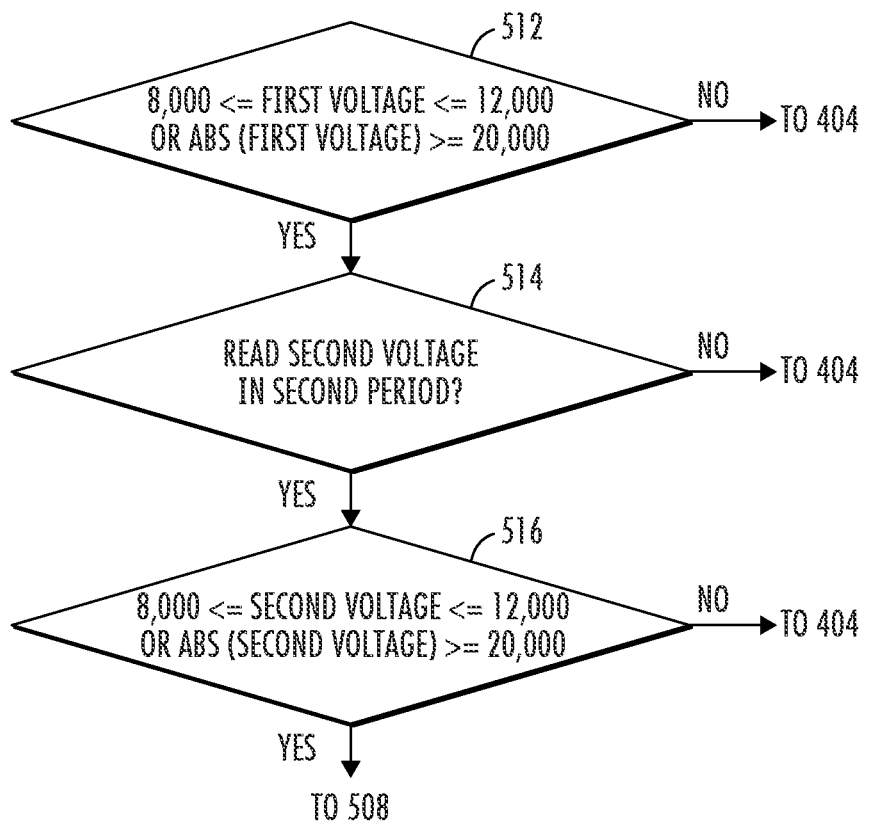

FIG. 5B illustrates additional operations that may be associated with operation 406 in various embodiments in accordance with the present disclosure. Determine if a first touch pad 110 has received a touch and an associated electrode 210 has generated a voltage at an electrode input pin based on the decimal values of voltage or charge. If a touch is detected, then determine if a touch on a second touch pad 110 has occurred in at a second time (e.g., after 300 ms).

At operation 512, the first voltage is compared to see if it is between the decimal values of 8,000 and 12,000 or if the absolute value is above 20,000. If the first voltage value does not meet these ranges, then the first voltage is determined not to be associated with a touch. The operations proceed to operation 404 to attempt to detect a first touch again. If the operations are within these ranges, then proceed to operation 514.

At operation 514, read a second voltage in a second period. Motion takes place over a time period. Thus the electrostatic sensor may wait a time period (e.g., 300 ms) and read a second voltage that is different from the first voltage to determine if motion is detected. As described herein, the second voltage is converted into a decimal value.

At operation 516, the second voltage is compared to see if it is between the decimal values of 8,000 and 12,000 or if the absolute value is above 20,000. If the second voltage value does not meet these ranges, then the second voltage is determined not to be associated with a touch. The operations proceed to operation 404 to attempt to detect a first touch again. If the operations are within these ranges, then proceed to operation to operation 508.

Figure 5C:
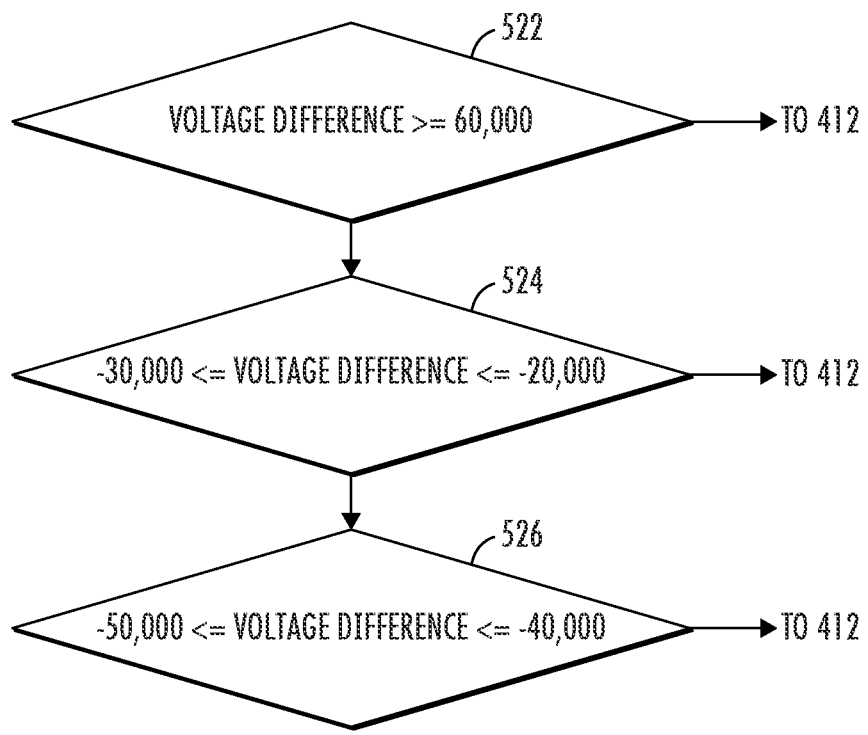

FIG. 5C illustrates additional operations that may be associated with operation 410 in various embodiments in accordance with the present disclosure. Determine if a right swipe has occurred based on determining if the value of the voltage difference is between a plurality of ranges. If so, an output is that a right swipe has occurred. Otherwise proceed to the next operation.

At operation 522, determine if the voltage difference is greater than or equal to 60,000. If this is determined, then proceed to operation 412. Otherwise proceed to operation 524.

At operation 524, determine if the voltage difference is greater than or equal to −30,000 and less than or equal to −20,000. If this is determined, then proceed to operation 412. Otherwise proceed to operation 526.

At operation 526, determine if the voltage difference is greater than or equal to −50,000 and less than or equal to −40,000. If this is determined, then proceed to operation 412. Otherwise proceed to operation the next operation.

Figure 5D:
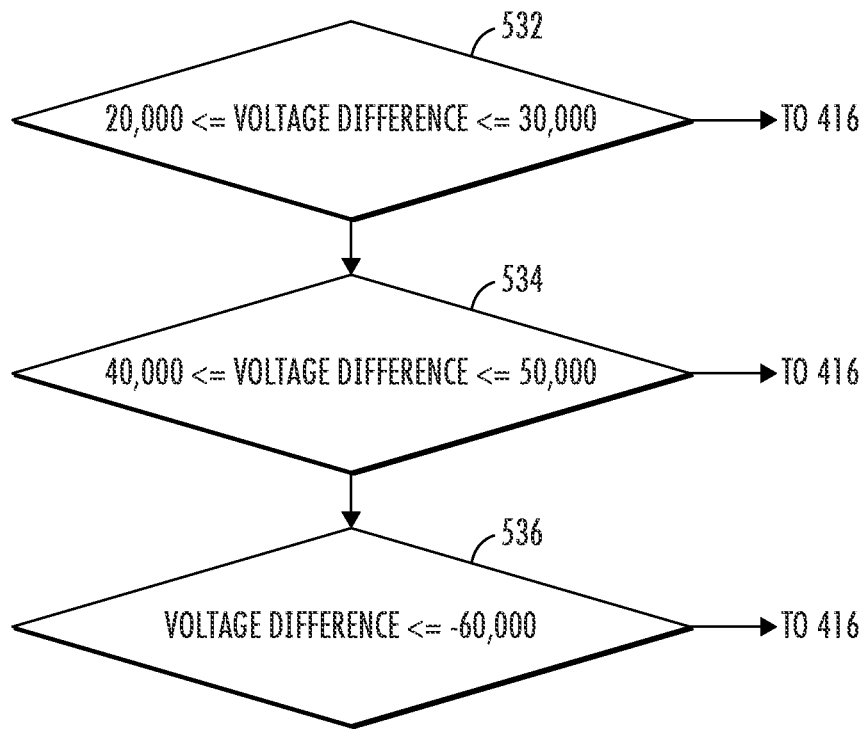

FIG. 5D illustrates additional operations that may be associated with operation 414 in various embodiments in accordance with the present disclosure. Determine if a left swipe has occurred based on determining if the value of the voltage difference is between a plurality of ranges. If so, an output is that a left swipe has occurred. Otherwise proceed to the next operation.

At operation 532, determine if the voltage difference is greater than or equal to 20,000 and less than or equal to 30,000. If this is determined, then proceed to operation 416. Otherwise proceed to operation 534.

At operation 534, determine if the voltage difference is greater than or equal to 40,000 and less than or equal to 50,000. If this is determined, then proceed to operation 416. Otherwise proceed to operation 536.

At operation 536, determine if the voltage difference is less than or equal to −60,000. If this is determined, then proceed to operation 416. Otherwise proceed to operation the next operation.

As the sensor circuitry is configured with specific voltage sources there are many voltages that could not be generated. Thus the ranges are checked to for specific decimal values to determine motion. If a decimal value for a voltage difference is not in various ranges, then motion is not detected.

In various embodiments, particularly if there are additional touch pads 110, there may be more than three ranges. For example, the operations of FIG. 5C and FIG. 5D may include additional ranges and/or thresholds. For example, five touch pads may have 8 ranges to be checked.

In various embodiments, a speed of motion may depend on the distance between two touchpads 110, which may be known in various embodiments. For a known sampling rate (e.g., 240 Hz), a speed of the motion may also be determined as distance over time.

FIG. 6 illustrates an exemplary block hardware diagram with a sensor hub for multiple touch pad arrays in accordance with one or more embodiments of the present disclosure. In various embodiments, the hardware and software of the present disclosure may be implemented as a finite state machine in an electrostatic sensor that may be in a MEMs sensor.

In a device 620 the touch pads may be separated into two arrays. For example, in a pair of smart glasses a first array may be located on a first arm of the smart glasses and a second touch pad array of touch pads 610B may be located on a second arm of the smart glasses. The touch pads 610A, 610B may be electrically connected to the electrostatic sensor 630, which may be electrically connected to a sensor hub 640 that is in communication with or electrically connected to a process 650. The sensor hub 640 may include a co-processor or digital signal processor (DSP) that is integrated or embedded in a chipset of an application processor. The sensor hub may be able to independently process the one or more tasks such as sensor hardware abstraction, device management, and/or data distribution.

FIG. 7 illustrates an example block hardware diagram of a device in accordance with one or more embodiments of the present disclosure.

The device 700 may be a system and/or apparatus that includes a processor 702, memory 704, communications circuitry 706, input/output circuitry 708, battery sensor circuitry 710, power circuitry 714, and all of which may be connected by a bus 712. While such connections are illustrated as bus 712, it will be readily appreciated that there may be multiple other connections.

The processor 702, although illustrated as a single block, may be comprised of a plurality of components and/or processor circuitry. The processor 702 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits. In various embodiments, the processor 702 may be configured to execute applications, instructions, and/or programs stored in the processor 702, memory 704, or otherwise accessible to the processor 702. When executed by the processor 702, these applications, instructions, and/or programs may enable the execution of one or a plurality of the operations and/or functions described herein. Regardless of whether it is configured by hardware, firmware/software methods, or a combination thereof, the processor 702 may comprise entities capable of executing operations and/or functions according to the embodiments of the present disclosure when correspondingly configured.

The memory 704 may comprise, for example, a volatile memory, a non-volatile memory, or a certain combination thereof. Although illustrated as a single block, the memory 704 may comprise a plurality of memory components. In various embodiments, the memory 704 may comprise, for example, a random-access memory, a cache memory, a flash memory, a hard disk, a circuit configured to store information, or a combination thereof. The memory 704 may be configured to write or store data, information, application programs, instructions, etc. so that the processor 702 may execute various operations and/or functions according to the embodiments of the present disclosure. For example, in at least some embodiments, a memory 704 may be configured to buffer or cache data for processing by the processor 702. Additionally or alternatively, in at least some embodiments, the memory 704 may be configured to store program instructions for execution by the processor 702. The memory 704 may store information in the form of static and/or dynamic information. When the operations and/or functions are executed, the stored information may be stored and/or used by the processor 702.

The communication circuitry 706 may be implemented as a circuit, hardware, computer program product, or a combination thereof, which is configured to receive and/or transmit data from/to another component or apparatus. The computer program product may comprise computer-readable program instructions stored on a computer-readable medium (e.g., memory 704) and executed by a processor 702. In various embodiments, the communication circuitry 706 (as with other components discussed herein) may be at least partially implemented as part of the processor 702 or otherwise controlled by the processor 702. The communication circuitry 706 may communicate with the processor 702, for example, through a bus 712. Such a bus 712 may connect to the processor 702, and it may also connect to one or more other components of the processor 702. The communication circuitry 706 may be comprised of, for example, transmitters, receivers, transceivers, network interface cards and/or supporting hardware and/or firmware/software, and may be used for establishing communication with another component(s), apparatus(es), and/or system(s). The communication circuitry 706 may be configured to receive and/or transmit data that may be stored by, for example, the memory 704 by using one or more protocols that can be used for communication between components, apparatuses, and/or systems.

The input/output circuitry 708 may communicate with the processor 702 to receive instructions input by an operator and/or to provide audible, visual, mechanical, or other outputs to an operator. The input/output circuitry 708 may comprise supporting devices, such as a keyboard, a mouse, a user interface, a display, a touch screen display, lights (e.g., warning lights), indicators, speakers, cameras, accelerometers, gyroscopes, and/or other input/output mechanisms. The input/output circuitry 708 may comprise one or more interfaces to which supporting devices may be connected. In various embodiments, aspects of the input/output circuitry 708 may be implemented on a device used by the operator to communicate with the processor 702. The input/output circuitry 708 may communicate with the memory 704, the communication circuitry 706, and/or any other component, for example, through a bus 712.

The sensor circuitry 710 may include an electrostatic sensor 230, touch pads 110, electrodes 210, and associated electrical components and/or electrical connections, including those described herein.

The power circuitry 714 may include a power management unit, a battery, wireless charging circuitry 716, and the like. In various embodiments the wireless charging circuitry 716 may share one or more components with the communications circuitry 706 and/or input/output circuitry 708, such as an antenna.

It should be readily appreciated that the embodiments of the systems and apparatuses, described herein may be configured in various additional and alternative manners in addition to those expressly described herein.

CONCLUSION

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:
1. A system for motion detection comprising:
an electrostatic sensor comprised of a first electrode input and a second electrode input, wherein the first electrode input is electrically connected via a first group of electrodes to a first group of touch pads of a plurality of touch pads, and wherein the second electrode input is electrically connected via a second group of electrodes to a second group of touch pads of the plurality of touch pads;

wherein the first group of touch pads includes a first touch pad and a second touch pad, wherein the first group of touch pads are configured to provide a first voltage signal to the first electrode input in response to a touch of one of the first touch pad or the second touch pad, wherein the first touch pad is electrically connected to a first voltage source of a first distinct voltage, wherein the second touch pad is electrically connected to a ground, wherein the first voltage signal is a first voltage in response to the touch of the first touch pad, and wherein the first voltage signal is a second voltage in response to the touch of the second touch pad;

wherein the second group of touch pads includes a third touch pad and a fourth touch pad, wherein the second group of touch pads are configured to provide a second voltage signal to the second electrode input in response to a touch of one of the third touch pad or the fourth touch pad; wherein the third touch pad is electrically connected to a second voltage source of a second distinct voltage, wherein the fourth touch pad is electrically connected to the ground, wherein the second voltage signal is a third voltage in response to the touch of the third touch pad, and wherein the second voltage signal is a fourth voltage in response to the touch of the fourth touch pad; and wherein the electrostatic sensor is configured to generate an output of a sensor signal based on a voltage difference, wherein the electrostatic sensor is configured to determine the voltage difference as a difference in voltage between the first voltage signal at the first electrode input of the electrostatic sensor and the second voltage signal at a second electrode input of the electrostatic sensor.

2. The system for motion detection of claim 1, wherein the plurality of touch pads is part of a touch pad array.

3. The system for motion detection of claim 2, wherein the touch pad array is configured with the plurality of touch pads arranged linearly in a first direction.

4. The system for motion detection of claim 3, wherein the plurality of touch pads is configured to generate a rising waveform in response to motion in a first direction.

5. The system for motion detection of claim 3, wherein the plurality of touch pads is configured to generate a falling waveform in response to motion in a first direction.

6. The system for motion detection of claim 1, wherein the electrostatic sensor comprises an analog-to-digital converter configured to:
convert the first voltage signal at the first electrode input from a first analog signal into a first decimal value;
convert the second voltage signal at the second electrode input from a second analog signal into a second decimal value; and
wherein the electrostatic sensor is further configured to generate the output of the sensor signal based on a determination of a motion based at least on a voltage difference by using a plurality of thresholds based on different decimal values associated with the voltage difference.

7. The system for motion detection of claim 1, wherein the electrostatic sensor is further configured to generate the output of the sensor signal including an indication of motion is a first direction.

8. The system for motion detection of claim 1, wherein the electrostatic sensor is further configured to generate the output of the sensor signal including an indication of motion is a second direction.

9. The system for motion detection of claim 1, wherein the electrostatic sensor is incorporated into a MEMS sensor.

10. The system for motion detection of claim 1, wherein the system is incorporated into one of smart glasses, a smartphone, a smart light, IoT device, or touch panel.

11. A method for motion detection comprising:
providing an electrostatic sensor comprised of a first electrode input and a second electrode input, wherein the first electrode input is electrically connected via a first group of electrodes to a first group of touch pads of a plurality of touch pads, wherein the second electrode input is electrically connected via a second group of electrodes to a second group of touch pads of the plurality of touch pads, wherein the first group of touch pads includes a first touch pad and a second touch pad, and wherein the second group of touch pads includes a third touch pad and a fourth touch pads;
reading, by the electrostatic sensor, a first voltage signal at the first electrode input, wherein the first voltage signal is provided from the first group of touch pads in response to a touch of one of the first touch pad or the second touch pad, wherein the first touch pad is electrically connected to a first voltage source of a first distinct voltage, wherein the second touch pad is electrically connected to a ground, wherein the first voltage signal is a first voltage in response to the touch of the first touch pad, and wherein the first voltage signal is a second voltage in response to the touch of the second touch pad;
reading, by the electrostatic sensor, a second voltage signal at the second electrode input, wherein the second voltage signal is provided from the second group of touch pads in response to a touch of one of the third touch pad or the fourth touch pad, wherein the third touch pad is electrically connected to a second voltage source of a second distinct voltage, wherein the fourth touch pad is electrically connected to the ground, wherein the second voltage signal is a third voltage in response to the touch of the third touch pad, and wherein the second voltage signal is a fourth voltage in response to the touch of the fourth touch pad;
determining a voltage difference of a difference in voltage between the first voltage signal at the first electrode input of the electrostatic sensor and the second voltage signal at the second electrode input of the electrostatic sensor;
generating an output of a sensor signal based on the voltage difference, wherein the sensor signal indicates motion.

12. The method for motion detection of claim 11, wherein the plurality of touch pads is part of a touch pad array.

13. The method for motion detection of claim 12, wherein the touch pad array is configured with the plurality of touch pads arranged linearly in a first direction.

14. The method for motion detection of claim 13, wherein the plurality of touch pads is configured to generate a rising waveform in response to motion in a first direction.

15. The method for motion detection of claim 13, wherein the plurality of touch pads is configured to generate a falling waveform in response to motion in a first direction.

16. The method for motion detection of claim 11, wherein the electrostatic sensor is further comprised of an analog-to-digital converter; and wherein reading the first voltage signal comprises converting the first voltage signal from a first analog signal to a first digital signal of a first decimal value; and wherein reading the second voltage signal comprises converting the second voltage signal from a second analog signal to a second digital signal of a second decimal value.

17. The method for motion detection of claim 11, wherein generating the output of the sensor signal comprises generating the sensor signal comprising an indication of motion in a first direction.

18. The method for motion detection of claim 11, wherein generating the output of the sensor signal comprises generating the sensor signal comprising an indication of motion in a second direction.

19. The method for motion detection of claim 11, wherein the electrostatic sensor is incorporated into a MEMS sensor.

20. The method for motion detection of claim 11, wherein the electrostatic sensor is incorporated into one of smart glasses, a smartphone, a smart light, IoT device, or touch panel.

* * * * *